May 12, 1942.   G. B. ENGELHARDT   2,282,951
MEASUREMENT OF PHASE SHIFT
Filed Nov. 15, 1938

INVENTOR
G. B. ENGELHARDT
BY H. A. Burgess
ATTORNEY

Patented May 12, 1942

2,282,951

UNITED STATES PATENT OFFICE 2,282,951

MEASUREMENT OF PHASE SHIFT

George B. Engelhardt, Hartsdale, N. Y., assignor to Bell Telephone Laboratories, Incorporated, New York, N. Y., a corporation of New York Application November 15, 1938, Serial No. 240,473

11 Claims. (Cl. 172—245)

This invention relates to the measurement of phase shift or difference in phase between alternating currents of identical frequency and more particularly to the measurement of the phase shift or phase delay which is characteristic of electrical transmission through certain transducers.

One such transducer is the uniform transmission line. If it is assumed that an alternating current having a frequency, for example of 1,000 cycles, is transmitted over a uniform line which has a rate of propagation for that frequency of 120,000 miles per second, then 1 cycle having a period of .001 second will extend over a distance of 120 miles. Since 1 cycle may be considered as composing 360 degrees, the current at a point 120 miles from the transmitting end will have shifted in phase 360 degrees and will be in phase with the transmitted current. At 60 miles it will have shifted 180 degrees and at 1 mile 3 degrees. Thus if the frequency and its rate of propagation over a uniform line are known the number of degrees shift in phase is a measure of the length of the line. In the example given, if the phase has shifted 300 degrees the length represented thereby is 100 miles. It is likewise apparent that by measuring the phase shift at a given frequency over a uniform line of known length the rate of propagation may be determined.

Shift in phase is sometimes spoken of in terms of delay, the delay of a line at a given frequency being the time required for a wave of that frequency to traverse that line. Thus in a 1,000-cycle wave a shift in phase of 360 degrees represents a delay for the interval of 1 complete cycle or .001 second, or a delay of .00001 second represents a phase shift of 3 degrees and 36 minutes at 1,000 cycles per second.

The determination of phase shift or delay is of interest to the communication engineer not only in connection with transmission lines and such incidental devices as transformers, filters and equalizers operated at voice frequency, but it is of particular interest in connection with transmission at high frequencies and over broad bands.

It is the object of this invention to provide a new and more facile means for the determination of phase shift or delay particularly at high frequencies.

High frequency phase shift measurement becomes particularly important in the study of certain transducers such, for example, as coaxial cable, over which it is feasible to use carrier frequencies of the order of millions of cycles per second with rate of propagation approaching the speed of light.

A conventional method of phase shift measurement is that disclosed in Nyquist et al. Patent 1,596,942, August 24, 1926. Thus voltage of the frequency at which the measurement is desired may be supplied in parallel to two circuits, one through the transducer to be measured and the other around it and then by connecting the output of these circuits into an appropriate detector, adjusting the phase of one voltage by means of a calibrated phase shifter to bring the two voltages into a desired and readily detected relation and then noting the change in phase shift necessary to restore this relation. When the connection through the transducer is replaced by a direct connection, the phase shift through the transducer is determined. While satisfactory for many purposes, this method has definite limitations where measurements at a considerable number of high frequencies are to be made. Not only must the phase shifter be separately calibrated for each frequency of use, but also the construction of a precise phase shifter for use at very high frequencies presents practical difficulties.

Aware of these limitations I have invented a new and improved phase shift measuring set whereby phase shift measurements at high, intermediate and even comparatively low frequencies may be made more quickly and easily than has heretofore been possible.

I may employ the single frequency voltage source of Nyquist et al., supra, feeding parallel circuits at least one of which contains a phase shifter calibrated in terms of the supply frequency. Thereafter, I then introduce into each circuit a harmonic generator which may be of the sort disclosed in Wrathall Patent 2,117,752, May 17, 1938, which is capable of producing a very large number of harmonics of substantially equal amplitudes. These harmonics are then transmitted through the known and unknown circuits and combined by means of an appropriate mixer. If the detector is tuned to the harmonic frequency at which phase shift measurement is desired and if the phase shifter is adjusted to bring the two harmonic voltages into the desired relation, the reading of the phase shifter multiplied by the order of the harmonic gives the phase shift in the unknown transducer at the harmonic frequency. For example, assuming a fundamental frequency of 4,000 cycles per second, a shift of 1 degree on the phase shifter calibrated at that frequency, represents a shift of 250 degrees at the 250th harmonic or 1,000,000 cycles.

For a specific illustration of the form of the invention reference is made to the drawing in which.

Figure 1:
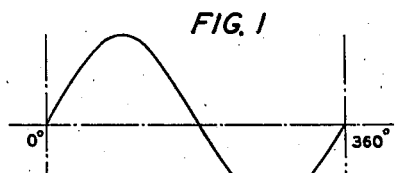
Fig. 1 shows a sinusoidal wave form.
Figure 3:
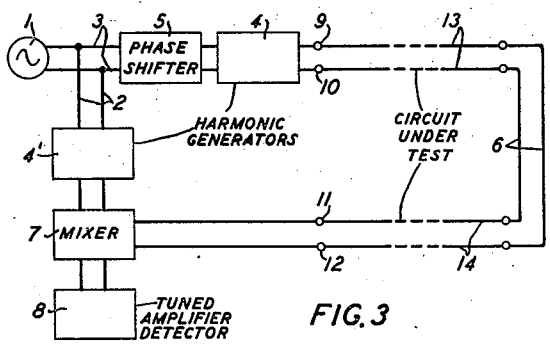
Fig. 3 is a simple diagram of a form of the invention.
Figure 2:
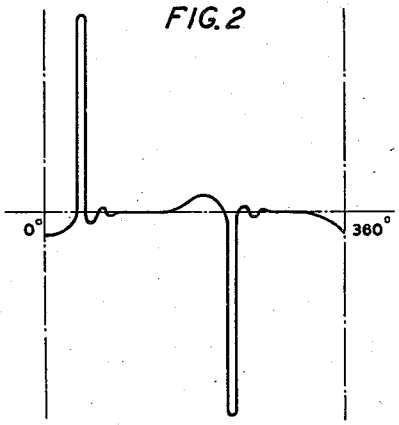
Fig. 2 shows a wave form which may be produced therefrom by a harmonic generator employed in the invention.
Figure 5:
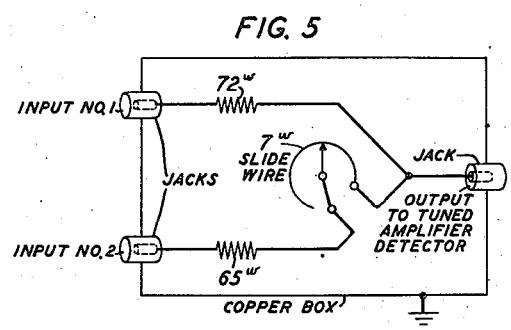
Fig. 5 shows a preferred construction of high frequency mixer.

Referring to Fig. 3, the alternating current generator 1 supplies substantially sinusoidal current to the parallel circuits 2 and 3. Circuit 2 comprises a harmonic generator 4' of the impulse type producing a wave form of the type shown in Fig. 2. Circuit 2 terminates in mixer 7. Circuit 3 comprises a phase shifter 5 calibrated in degrees phase shift at the frequency of the alternating current generator 1. In sequence to phase shifter 5 is a harmonic generator 4 equivalent to the harmonic generator 4' of circuit 2 and thereafter the unknown transducer shown as circuit 13, 6, 14. Circuit 3 also terminates in mixer 7. Mixer 7 may consist of fixed and variable resistances arranged to terminate the incoming circuits 2 and 3 without permitting substantial reaction of one circuit upon the other and at the same time to combine the outputs of the two circuits in relative amounts as desired for transmission into tuned amplifier-detector 8. Such mixers are well known in the art. One form of such a mixer is shown in Fig. 5.

The frequency which the generator 1 is designed to provide depends upon the range of frequencies at which phase shift measurements in the transducer 13, 6, 14 are to be determined. If voice frequency measurements are desired the generator 1 might be designed to deliver, for example, 60-cycle voltage. If very high frequency measurements are required a generator providing a frequency of several thousand cycles may be employed.

It is to be understood, of course, that the phase shifter 5 is designed and calibrated for use at the particular fundamental frequency supplied by the generator. A suitable phase shifter may be that disclosed in Nyquist et al., supra.

In general, it will be found desirable to proportion the impulse harmonic generators in accordance with the frequency at which they are to operate. When thus proportioned it has been found that all the harmonics up to at least the 250th may be obtained all at substantially the same amplitude.

The tuned amplifier-detector 8 should have a selective member capable of being adjusted or tuned to select with adequate discrimination frequencies in the range at which phase shift measurements are being made and this may be preceded and followed by suitable amplifiers as required. The detector may consist of a rectifier and direct current meter or a rectifier and headphones or, if desired, a cathode ray oscillograph. It will be apparent to those skilled in the art that the tuned amplifier-detector 8 may conveniently assume any one of a number of forms and that, moreover, the design will depend in large part upon the frequency range at which observations are being made.

Assume, for example, that generator 1 is delivering a voltage at a frequency of 100 cycles per second and that it is desired to determine the phase shift in the transducer 13, 6, 14 at the frequency of 10,000 cycles. If the phase shifter 5 is set for zero phase shift at 100 cycles, the voltages at the input of the impulse generators 4, 4' will be in phase with each other. The impulse generators 4, 4' are assumed to be equivalent and may be so made and since it is characteristic of impulse generators of the type employed that the various harmonics have a fixed phase relation to the fundamental so long as the shape of the impulse peak is the same, the various respective harmonics emerge from the generators 4, 4' in phase with each other. Thus assuming that incidental circuital phase shifts are negligible the impulse wave will reach the mixer 7 by way of circuit 3 in phase with the impulse wave reaching mixer 7 by way of circuit 2 except for the phase shifts caused by the interposition of transducer 13, 6, 14 in circuit 3. It is understood that the waves passing into and through mixer 7 contain all the harmonics generated by the impulse generators 4, 4'. These composite waves are fed to tuned amplifier-detector 8 which, in this case, is tuned to accept only 10,000 cycles. If then, for example, the detector employed includes a rectifier and direct-current meter the phase shifter 5 might be adjusted to produce maximum reading on the meter, thus indicating that the waves were in phase and the phase shift of the transducer 13, 6, 14 would be measured by the phase shift of the phase shifter 5 multiplied by 100, the order of the harmonic. On the other hand, if headphones were used for final detection the phase shifter 5 might be adjusted to give minimum tone in the phones, thus indicating that the waves were adjusted to be 180 degrees out of phase. Again the phase shift in the 10,000-cycle wave is 100 times the phase shift in the 100-cycle wave caused by phase shifter 5, allowance being made for the fact that the two 10,000-cycle waves are actually set 180 degrees out of phase.

It is apparent that in the arrangement shown in Fig. 3 in which the phase shifter 5 and the unknown transducer 13, 6, 14 are in series in the same circuit, the shift in phase produced by the phase shifter 5 must ordinarily be in the opposite direction from that produced by transducer 13, 6, 14 in order that the current into the mixer 7 from circuit 3 shall be in phase with the current in the mixer 7 from circuit 2 in which zero phase shift is assumed. Likewise, if it were desired to include phase shifter 5 in circuit 2 instead of as shown in circuit 3, the phase shift of the transducer 13, 6, 14 in circuit 3 and the phase shifter 5 assumed to be in circuit 2 would ordinarily be in the same direction in order that the input wave into the mixer 7 from the two circuits 2, 3 should be in phase. It is also obvious that, if desired, a phase shifter might be included in both circuit 2 and circuit 3 and adjustment of either or both employed to balance the phase shift due to the transducer 13, 6, 14.

It is to be understood that the diagram of Fig. 3 is designed to show in its simplest form an arrangement for the employment of the invention for the measurement of phase shift. The phase shift measuring set thus shown is provided with terminals 9, 10 and 11, 12 for the connection of a transducer to be measured. Thus 13 may be an outgoing line connected to terminals 9, 10, a cross-connection 6 may be employed to strap the far end of a line 13 to the far end of a line 14 and the near end of a line 14 may be connected to terminals 11, 12 whereby the phase shift through the looped lines may be determined.

In many cases it will be found of practical convenience to measure the phase shift of the unknown transducer 13, 6, 14 by a substitution method as illustrated in Nyquist et al., supra. In this case, a first setting of the phase shifter would be made by disconnecting the transducer 13, 6, 14 and strapping terminals 9 and 10, respectively, to terminals 11 and 12. A second setting of the phase shifter would then be made with these straps removed and the transducer 13, 6, 14 connected in circuit as shown, whereupon the difference in the two settings of the phase shifter represents the shift in phase caused by the transducer.

Figure 4:
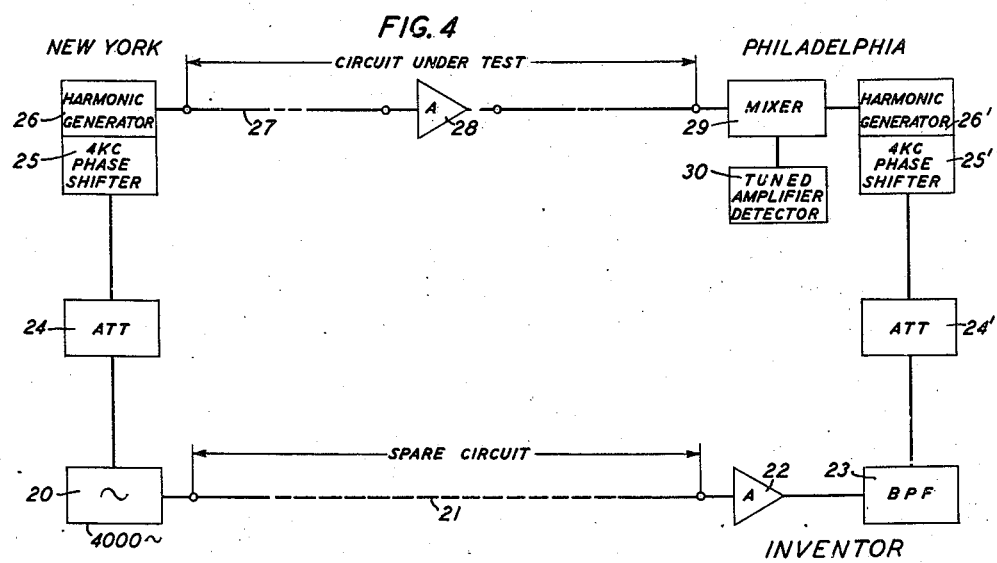
Fig. 4 shows how the measuring set of the invention may be arranged for straightaway measurements.

In Fig. 4 is shown an arrangement according to the invention for making straightaway measurements as, for example, upon an experimental coaxial cable between New York and Philadelphia. A 4,000 cycle source of standard frequency 20 supplies two circuits. One circuit is by way of attenuator 24, phase shifter 25, harmonic generator 26 and thence over the New York-Philadelphia line under test 27, which may and usually will contain amplifiers as represented by amplifier 28 and thence through mixer 29. The other circuit leads from source 20 via spare New York-Philadelphia circuit 21, amplifier 22, band-pass filter 23 designed to eliminate any distortion in the 4,000-cycle source which may have been introduced, attenuator 24', phase shifter 25', harmonic generator 26' and thence to mixer 29, which may take the form shown in Fig. 5. Mixer 29 feeds tuned amplifier-detector 30.

It is to be noted that the arrangement of Fig. 4 is not primarily adapted to make measurements of phase shift over the circuit 27 at a single frequency. This is evident since it is apparent that the 4,000-cycle voltage applied to the harmonic generator 26 will not, in general, be in phase with the voltage applied to the harmonic generator 26' even though the phase shifters 25, 25' are set for zero phase shift since the circuit comprising line 21, amplifier 22, band-pass filter 23 and attenuator 24' may be expected to cause some phase shift in the 4,000-cycle current. However, it is feasible to determine the change in phase shift with frequency by this arrangement and also to make measurements of envelope delay which is the slope of the delay versus frequency curve. Fig. 4 illustrates a means of determining the delay distortion or envelope delay distortion for a range of, for example, from 60 kilocycles to 1,000 kilocycles over the circuit 27. For this purpose, harmonic generators 26, 26' will have been calibrated side by side, the one against the other, so that the $n$th harmonic of 4,000 cycles produced by generator 26, will be precisely in phase with the $n$th harmonic of 4,000 cycles produced by generator 26' when the respective 4,000-cycle voltages applied to these two generators are in phase.

I have thus disclosed novel means illustrated by a preferred embodiment whereby phase shift or delay measurements may be made quickly and precisely and with particular advantage where such measurements over an extended frequency range are required. It will be apparent, however, that many other arrangements and embodiments may be employed without departing from the spirit of the invention which I have particularly defined in the appended claims.

What is claimed is:

1. In combination, means to produce a fundamental wave, a pair of impulse producing means to produce two independent predetermined ranges of harmonics from two different portions of the fundamental waves such that the phase angles of corresponding harmonics in both ranges are fixed relative to the phase angle of the fundamental wave, circuit means to connect the fundamental means to the pair of impulse means, a transducer disposed in the output of one impulse means to introduce an unknown amount of change in the phase angles of one range of harmonics, means to combine the outputs of the other impulse means and the transducer, means to detect the phase relation between certain combined harmonics having the same order in the output of the combining means, and phase shifting means embodied in the circuit means in the input of the one impulse means to introduce a known amount of change in the phase angle of the portion of the fundamental wave supplied thereto to compensate for the unknown amount of change introduced in the phase angles of the one range of harmonics, the known amount of phase angle change introduced in the one portion of the fundamental wave bearing a numerical ratio to the unknown amount of phase angle change introduced in the one range of harmonics, which ratio is the same as the ratio of the fundamental wave to the order of the detected certain harmonics.

2. In combination, means to produce a fundamental wave, a pair of phase shifting means, a pair of harmonic generators to produce two independent and identical ranges of harmonics from two different portions of the fundamental wave such that the phase angles of corresponding harmonics in both ranges are fixed relative to the phase angle of the fundamental wave, a pair of transducers, one of which is to be tested for phase delay over a range of frequencies, means to combine the two ranges of harmonics, a first circuit means to connect the fundamental wave producing means to the combining means embodying in sequence one phase shifting means, one harmonic generator and the transducer to be tested, a second circuit means to connect the fundamental wave producing means to the combining means embodying in sequence the other transducer, the other phase shifting means and the other harmonic generator, and means connected to the combining means to detect the phase relation between certain combined harmonics having the same frequency, both phase shifting means being initially adjusted to apply the two different portions of the fundamental waves cophasally to both harmonic generators so that the two ranges of harmonics will have initially the same phase relation and the one phase shifting means being thereafter adjusted to introduce a known amount of phase delay in the one portion of the fundamental wave supplied to the one harmonic generator to compensate for the phase delay introduced in the one range of harmonics by the transducer to be tested.

3. In combination, a source of fundamental frequency waves, two identical harmonic producers connected thereto, a phase shifter inserted between said source and one of said harmonic producers, a circuit whose phase shift characteristic is to be determined at one or more of the harmonic frequencies, a tunable detector, and circuit means simultaneously connecting the input of said detector to the output sides of both of said harmonic producers and for including said circuit in series between the output of one of said harmonic producers and said detector, said detector including means for selecting harmonic frequency waves of corresponding order.

4. The method of measuring change in the phase angle of a harmonic frequency wave of certain order derived from a fundamental frequency wave, which method comprises introducing an unknown amount of change in the phase angle of said harmonic frequency wave and introducing a known amount of change in the phase angle of said fundamental frequency wave to compensate for the unknown amount of phase angle change introduced in said harmonic frequency wave, said unknown amount of phase angle change in said harmonic frequency wave being equivalent to the product of said known amount of phase angle change in said fundamental frequency wave and the order of said harmonic frequency wave.

5. The method of measuring the phase angle between two harmonic frequency waves having a certain order and derived from two different portions of a fundamental frequency wave, said two harmonic frequency waves initially having a certain phase relation, which method comprises introducing an unknown amount of change in the phase angle of one harmonic frequency wave, observing the phase relation between said two harmonic frequency waves, and introducing a known amount of change in the phase angle of one portion of the fundamental frequency waves such that the two harmonic frequency waves are caused again to have said certain phase relation, the product of the known amount of phase angle change of said one portion of the fundamental frequency waves and the order of said observed harmonic frequency waves representing the unknown amount of phase angle change in said one harmonic frequency wave.

6. The method of measuring the phase angle between two harmonic frequency waves of certain order and derived from two different portions of a fundamental frequency wave, said two harmonic frequency waves initially having coinciding phase angles, which method comprises changing by an unknown amount the phase angle of one harmonic frequency wave, and changing by a known amount the phase angle of the one portion of said fundamental frequency wave from which said one harmonic frequency wave is derived to cause the phase angle of said one harmonic frequency wave to coincide again with the phase angle of the other harmonic frequency wave, the unknown amount of phase angle change in said one harmonic frequency wave bearing a ratio to the known amount of phase angle change in said one portion of said fundamental frequency wave, which ratio is the same as the order of said one harmonic frequency wave.

7. The method of measuring the phase angle between successive pairs of harmonic frequency waves corresponding in order in two groups and extending over a certain frequency range, said two groups of harmonic frequency waves being derived from two different portions of a fundamental frequency wave and individual harmonic frequency waves corresponding in order initially having coinciding phase angles, which method consists of introducing an unknown amount of change in the phase angles of one group of harmonic frequency waves, selecting from both said harmonic groups in a successive manner individual harmonic frequency waves corresponding in order, observing the phase angle between said successively selected individual harmonic frequency waves of corresponding order, introducing a known amount of change in the phase angle of the portion of the fundamental frequency waves from which said one group of harmonic frequency waves is derived to cause the phase angles of successively selected individual harmonic frequency waves of said one harmonic group to coincide again with the phase angles of successively selected individual harmonic frequency waves of corresponding order in the other harmonic group, the unknown amount of phase angle change in the successively selected individual harmonic frequency waves of said one harmonic group being proportional to their order.

8. In combination, a source of fundamental frequency waves, two harmonic generators applied to said fundamental source to produce from two different portions of said fundamental waves two independent and identical ranges of harmonic frequency waves such that corresponding harmonic frequency waves in both said ranges have coinciding phase angles, electrical apparatus connected to the output of one harmonic generator to introduce an unknown amount of change in the phase angles of one range of harmonic frequency waves, means common to the outputs of both said apparatus and the other harmonic generator to select from both said ranges of harmonic frequency waves successive individual harmonic frequency waves of corresponding order including means to observe the phase angle between the successively selected individual harmonic waves of corresponding order, and phase shifting means interposed between said fundamental source and said one harmonic generator to introduce a known amount of change in the phase angle of one portion of said fundamental frequency waves to cause the phase angles of the successively observed individual harmonic frequency waves of said one range of harmonic frequency waves to coincide again with the phase angles of the successively observed corresponding individual harmonic frequency waves of the other range of harmonic waves, the amount of change introduced in the phase angles of the individual harmonic frequency waves of said one range of harmonic frequency waves by said apparatus being represented by the product of the known amount of change introduced in the phase angle of said one portion of said fundamental frequency waves and the order of the individual harmonic frequency waves.

9. In combination, a source of fundamental frequency waves, two harmonic generators applied to said source to produce from two different portions of said fundamental waves two independent and identical ranges of harmonic frequency waves such that corresponding harmonic frequency waves in both said harmonic ranges have a certain phase relation, electrical apparatus connected to the output of one harmonic generator to introduce an unknown amount of change in the phase angles of one range of harmonic frequency waves, means connected to the outputs of both said apparatus and the other harmonic generator to observe the phase relation between successive individual harmonic waves of corresponding order, and phase shifting means interposed between said fundamental source and one harmonic generator to introduce a known amount of change in the phase angle of one portion of said fundamental waves to compensate for the unknown amount of change in the phase angles of said one range of harmonic frequency waves such that the successively observed individual harmonic frequency waves of both said harmonic frequency ranges are caused again to have said certain phase relation, the amount of change in the phase angles of the successively observed individual harmonic frequency waves of said one range of harmonic frequency waves being proportional to their order.

10. The method comprising producing from a given base frequency wave a group of harmonic frequency waves, passing a given harmonic frequency wave through a path whose phase shift at the frequency of said given harmonic is to be determined, receiving said harmonic wave after traversing said path, independently generating from said base frequency wave a similar group of harmonic frequency waves, comparing against the harmonic wave received from said path the harmonic wave of corresponding frequency in said second group and determining the phase shift produced in said given harmonic wave in traversing said path by shifting the phase of the base frequency wave from which one only of the said groups of harmonics is generated, by such a known amount as is necessary to bring the two harmonic waves that are being compared into a certain definite phase relation, said phase shift of said harmonic wave being equal to said known amount of phase shift of said base frequency wave multiplied by the frequency ratio of said harmonic wave to said base frequency wave, corrected by the phase shift involved in said certain definite phase relation if different from zero.

11. The method of comprising sending a base frequency wave over a long line, independently generating from said wave at each end of said line a wave which is a given harmonic of said base frequency wave, sending the harmonic wave so generated at the near end over a path extending from the near end to the far end of said line whereby said harmonic wave undergoes a relative phase shift with respect to the base frequency wave, comparing the harmonic wave received over said path at the far end with the harmonic wave generated at the far end, and determining the relative phase shift of said harmonic wave in traversing said path by shifting the phase of the base frequency wave from which the harmonic wave is generated at the far end of the line, by such a known amount as is necessary to bring the two harmonic waves being compared into a certain definite phase relation, said relative phase shift of said harmonic wave being equal to said known amount of phase shift of said base frequency wave multiplied by the frequency ratio of said harmonic wave to said base frequency wave, corrected by the phase shift involved in said certain definite phase relation if other than zero.

GEORGE B. ENGELHARDT.